US012266949B2

United States Patent
Abotabl et al.

(10) Patent No.: US 12,266,949 B2
(45) Date of Patent: Apr. 1, 2025

(54) BASE STATION (GNB)-ASSISTING-ENERGY HARVESTING (EH) FROM NEARBY USER EQUIPMENTS (UES)

(71) Applicant: QUALCOMM Incorporated, San Diego, CA (US)

(72) Inventors: Ahmed Attia Abotabl, San Diego, CA (US); Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/645,624

(22) Filed: Dec. 22, 2021

(65) Prior Publication Data

US 2023/0198317 A1    Jun. 22, 2023

(51) Int. Cl.
*H02J 50/80* (2016.01)
*H02J 50/00* (2016.01)
*H02J 50/20* (2016.01)
*H04L 5/00* (2006.01)

(52) U.S. Cl.
CPC ............ *H02J 50/80* (2016.02); *H02J 50/001* (2020.01); *H02J 50/20* (2016.02); *H04L 5/0048* (2013.01)

(58) Field of Classification Search
CPC .......... H02J 50/001; H02J 50/20; H02J 50/80; H04L 5/00
See application file for complete search history.

(56) References Cited

U.S. PATENT DOCUMENTS

2015/0303741 A1* 10/2015 Malik .................... H02J 50/20
                                                        307/104
2017/0025857 A1   1/2017 Matthews
2017/0181110 A1*  6/2017 Belogolovy ............ H02J 50/23
(Continued)

FOREIGN PATENT DOCUMENTS

WO    WO-2020236664 A1    11/2020
WO    WO-2020236665 A1    11/2020
WO    WO-2021155209 A1     8/2021

OTHER PUBLICATIONS

International Search Report and Written Opinion—PCT/US2022/079632—ISA/EPO—Mar. 3, 2023.

*Primary Examiner* — Daniel Cavallari
*Assistant Examiner* — Joseph N Inge
(74) *Attorney, Agent, or Firm* — QUALCOMM Incorporated

(57) ABSTRACT

Systems, methods, and devices for wireless communication that support mechanisms for signaling resources available for energy harvesting (EH) to a UE in a wireless communication system. In aspects, a base station transmits an indication to an UE of resources (e.g., time and/or frequency resources) available to the UE for EH. The resources may include resources over which uplink transmissions are transmitted from one or more UEs and/or resources over which downlink transmission are transmitted from the base station to the one or more UEs. The base station may include additional information in the indication to the UE. In aspects, the indication from the base station to the UE of the resources available for EH and/or the additional information may enable the EH UE to more efficiently harvest energy from the uplink transmissions from neighboring UEs and/or downlink transmissions from the base station.

26 Claims, 7 Drawing Sheets

(56) References Cited

U.S. PATENT DOCUMENTS

| | | | | |
|---|---|---|---|---|
| 2020/0083757 A1* | 3/2020 | Altinel | ............... | H02J 50/001 |
| 2020/0336185 A1* | 10/2020 | Lee | ............... | H02J 50/90 |
| 2021/0359553 A1* | 11/2021 | Zeine | ............... | H02J 50/20 |
| 2022/0070836 A1* | 3/2022 | Balasubramanian | .. | H04J 11/004 |
| 2022/0078779 A1* | 3/2022 | Xu | ............... | H02J 50/80 |
| 2022/0225402 A1* | 7/2022 | Elkotby | ............... | H02J 50/001 |
| 2022/0248432 A1* | 8/2022 | Balasubramanian | ... | H02J 50/20 |

* cited by examiner

BASE STATION (GNB)-ASSISTING-ENERGY HARVESTING (EH) FROM NEARBY USER EQUIPMENTS (UES)

TECHNICAL FIELD

Aspects of the present disclosure relate generally to wireless communication systems, and more particularly, to mechanisms for energy harvesting.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, from a base station, an indication of one or more resources available to the UE for energy harvesting (EH), and determining to harvest energy from a transmission over at least one of the one or more resources available to the UE for EH based on the indication.

In an additional aspect of the disclosure, a method of wireless communication performed by a base station includes identifying one or more resources available for EH, and transmitting, to a UE, an indication of the one or more resources available for EH. In aspects, the UE is configured to determine to harvest energy from a transmission over at least one of the one or more resources available for EH based on the indication.

In an additional aspect of the disclosure, a UE includes at least one processor and a memory coupled to the at least one processor. The at least one processor stores processor-readable code that, when executed by the at least one processor, is configured to perform operations including receiving, from a base station, an indication of one or more resources available to the UE for EH, and determining to harvest energy from a transmission over at least one of the one or more resources available to the UE for EH based on the indication.

In an additional aspect of the disclosure, a base station includes at least one processor and a memory coupled to the at least one processor. The at least one processor stores processor-readable code that, when executed by the at least one processor, is configured to perform operations including identifying one or more resources available for EH, and transmitting, to a UE, an indication of the one or more resources available for EH. In aspects, the UE is configured to determine to harvest energy from a transmission over at least one of the one or more resources available for EH based on the indication.

In an additional aspect of the disclosure, a non-transitory computer-readable medium stores instructions that, when executed by a processor, cause the processor to perform operations. The operations include receiving, by a UE from a base station, an indication of one or more resources available to the UE for EH, and determining to harvest energy from a transmission over at least one of the one or more resources available to the UE for EH based on the indication.

In an additional aspect of the disclosure, a non-transitory computer-readable medium stores instructions that, when executed by a processor, cause the processor to perform operations. The operations include identifying, by a base station, one or more resources available for EH, and transmitting, to a UE, an indication of the one or more resources available for EH. In aspects, the UE is configured to determine to harvest energy from a transmission over at least one of the one or more resources available for EH based on the indication.

In an additional aspect of the disclosure, an apparatus includes means for receiving, by a UE from a base station, an indication of one or more resources available to the UE for EH, and means for determining to harvest energy from a transmission over at least one of the one or more resources available to the UE for EH based on the indication.

In an additional aspect of the disclosure, an apparatus includes means for identifying, by a base station, one or more resources available for EH, and means for transmitting, to a UE, an indication of the one or more resources available for EH. In aspects, the UE is configured to determine to harvest energy from a transmission over at least one of the one or more resources available for EH based on the indication.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
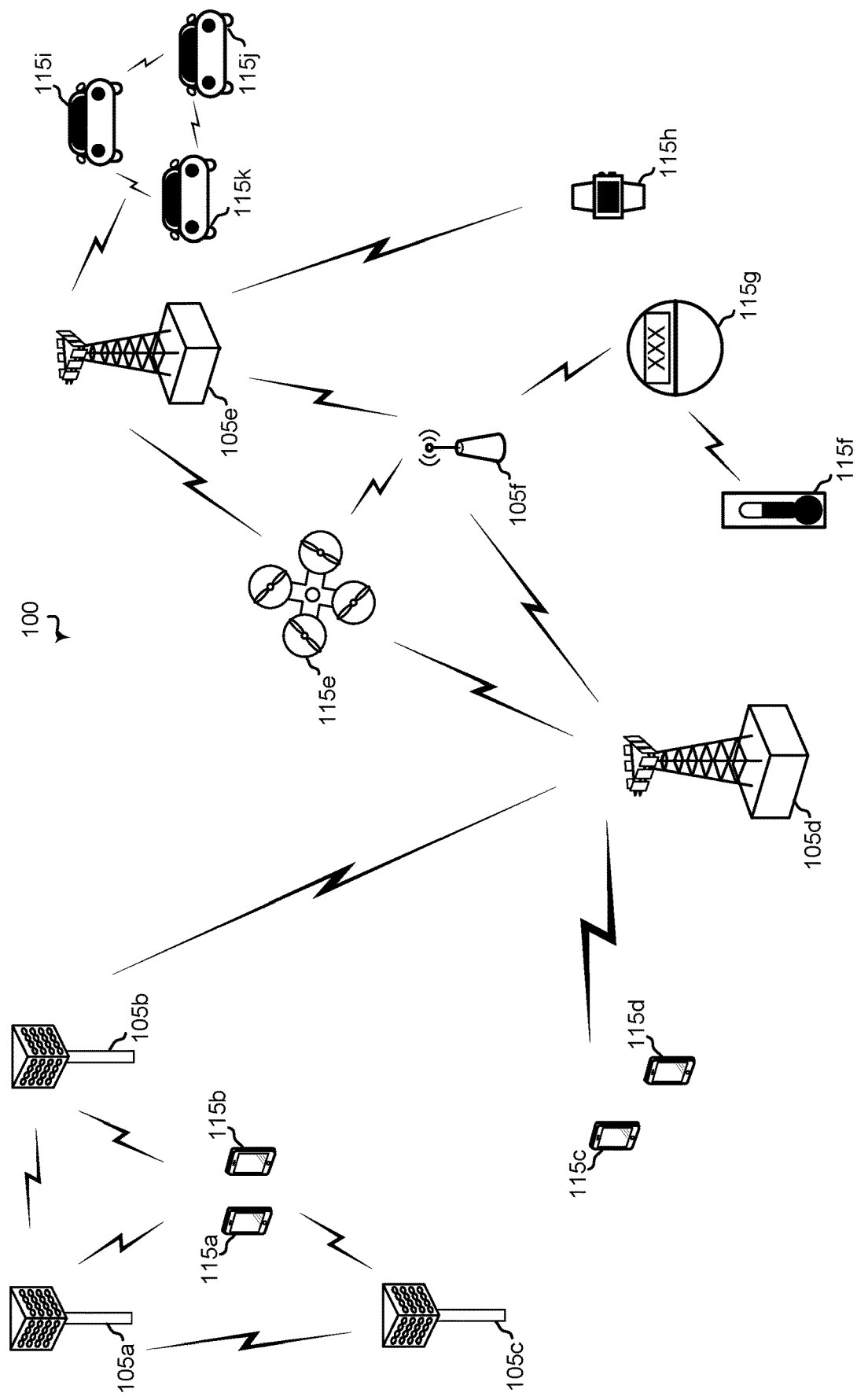
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS, LTE, and NR are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, aggregated or dis-aggregated deployments, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with one or more UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water meter, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
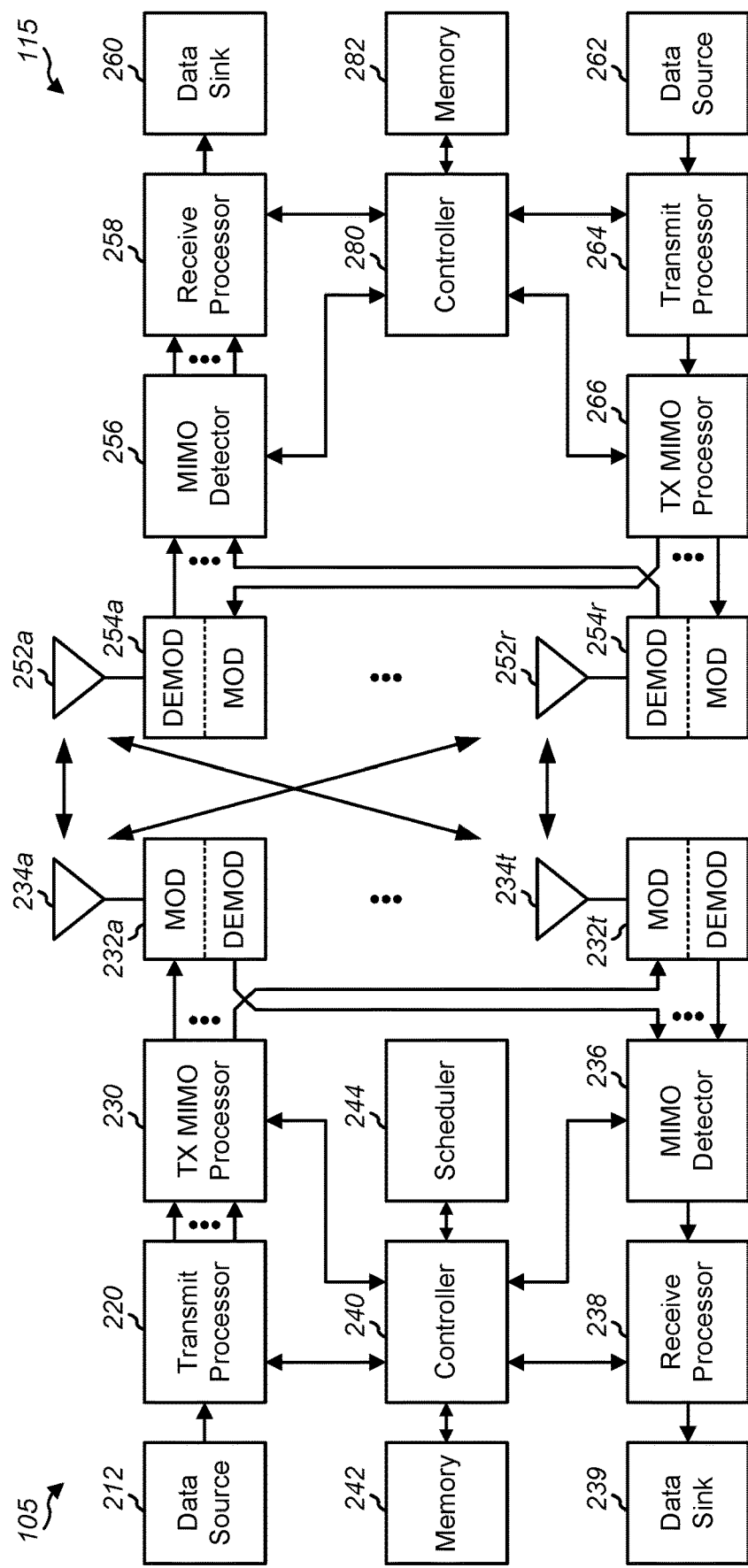
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current wireless communication systems, some UEs may implement energy harvesting (EH). In EH, a UE may harvest energy from RF signals, and may use the harvested RF energy to perform tasks, such as data decoding, data reception, data encoding, data transmission, data decoding, operating some filters, etc. For example, a UE may harvest energy from a signal from either a base station or a nearby UE.

The purpose of EH is not necessarily to charge the UE, but rather to harvest energy in a way that certain tasks may be performed using the harvested energy. As such, EH may be particularly suited for low power UEs (e.g., wearable devices, smart watches, low-power devices, internet of things (IoT) devices, etc.). In this manner, a UE in a network may interact in the network using the energy harvested in the network from network transmissions.

Currently, there are three main EH architecture: separated receiver architecture, time-switching architecture, and power-splitting architecture. In a separated receiver architecture, a UE may include a receiver for EH and a separate receiver for receiving information (e.g., receiving downlink signals from a base station or sidelink signals from other UEs). In this manner, the UE may harvest RF energy from signals received using the EH receiver, and may receive information using the other receiver. In a time-switching architecture, a UE may be configured to switch between information reception and EH. For example, some symbols, slots, etc., may be configured for the UE to receive information, and other symbols, slots, etc., may be configured for the UE to harvest energy. In a power-splitting architecture, a UE may be configured to split any received RF signals into two streams, one stream used to receive information and the other stream to harvest energy. In this manner, a received signal may be used by a UE both for receiving information and for EH.

It is noted that, an EH UE (e.g., a UE implementing EH operations) may be able to collect energy via EH, but the EH operations may also consume power. Therefore, an EH UE may not be able to "listen" for signals from which to harvest energy, as doing so consumes power. On the other hand, the EH UE may be able to harvest energy from uplink signals from nearby UEs, and/or from downlink signals from a base station to other UEs. However, there are currently no mechanisms for signaling to an EH UE resources over which uplink and/or downlink transmissions between a base station and other UEs take place.

Various aspects of the present disclosure are directed to systems and methods that support mechanisms for signaling resources available for EH to an EH UE in a wireless communication system. In aspects, a base station may transmit an indication to an UE of resources (e.g., time and/or frequency resources) available to the UE for EH. The resources may include resources over which uplink transmissions are transmitted from one or more UEs and/or resources over which downlink transmission are transmitted from the base station to the one or more UEs. In some aspects, the base station may include additional information in the indication to the UE (e.g., a transmission power of the uplink and/or downlink transmissions, pathloss information, transmission beam information, relative location information (e.g., location of the base station and/or of the one or more UEs, etc.). In aspects, the indication from the base station to the UE of the resources available for EH and/or the additional information may enable the EH UE to more efficiently harvest energy from the uplink transmissions from neighboring UEs and/or downlink transmissions from the base station.

In some aspects, the base station may send an indication to a neighboring UE of the EH UE of a beam for the neighboring UE to use for uplink transmissions to the base station, where the beam for the neighboring UE to use for uplink transmissions to the base station may be optimal for EH by the EH UE, but may be different than an optimal beam for the uplink transmission from the neighboring UE to the base station.

Figure 3:
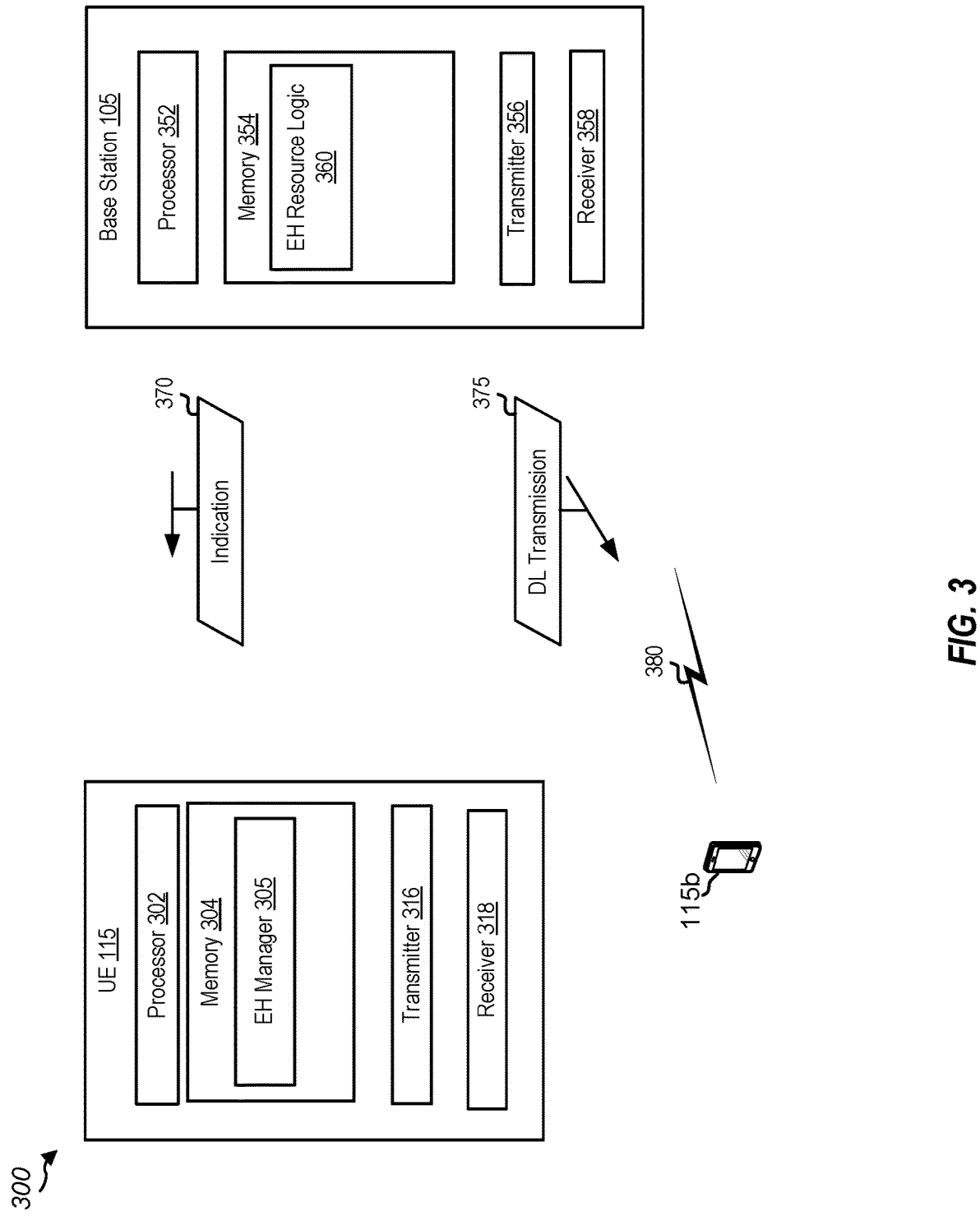
FIG. 3 is a block diagram illustrating an example wireless communication system that supports mechanisms for signaling resources available for energy harvesting to a UE according to one or more aspects.

FIG. 3 is a block diagram of an example wireless communications system 300 that supports mechanisms for signaling resources available for EH to an EH UE in a wireless communication system according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and one or more antenna modules 306 (hereinafter referred to collectively as "antenna module 306"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store EH manager 305. In aspects, EH manager 305 is configured to perform operations for receiving and/or determining an indication, from base station 105, of resources available for EH, and/or for harvesting energy from transmissions over the indicated resources in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to EH resource logic 360. In aspects, EH resource logic 360 is configured to perform operations for determining resources available for EH, and/or for indicating, to UE 115, the resources available for EH in accordance with aspects of the present disclosure. In aspects, EH resource logic 360 may be configured to determine an optimal beam for EH from uplink transmissions from another UE (e.g., UE 115b) to base station 105, and to indicate to UE 115b to transmit uplink transmissions to base station 105 using the optimal beam for EH. In these aspects, UE 115 may harvest energy from the optimal beam for EH. In aspects, the optimal beam for EH may be different from the optimal beam for transmitting the uplink transmission from UE 115b to the base station.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 identifies one or more resources available for EH. For example, base station 105 may configure resources for transmitting downlink signals to UEs (e.g., including UE 115 and/or other UEs) and for receiving uplink signals from UEs. In this manner, base station 105 may be particular well suited to determine which of those resources may be available to UE 115 for EH. Base station 105 determines the one or more resources that are available to UE 115 for EH. These one or more resources may be available to UE 115 for EH in that UE 115 may be able to harvest energy from transmissions transmitted over the one or more resources.

During operation of wireless communication system 300, base station 105 transmits an indication (e.g., indication 370) of the one or more resources available to UE 115 for EH. In aspects, indication 370 may be included in a downlink control signal (e.g., a downlink control information (DCI) message, a radio resource control (RRC) message, and/or any other downlink transmission to UE 115). In aspects, indication 370 of the one or more resources available to UE 115 for EH may include an indication of time and/or frequency resources available for EH.

During operation of wireless communication system 300, UE 115 may receive indication 370 of the one or more resources available to UE 115 for EH and may determine whether to harvest energy from transmissions transmitted over the one or more resources available for EH. For example, a transmission may be transmitted over the one or more resources indicated as available for EH by base station 105. The transmission may be an uplink transmission (e.g., uplink transmission 380) from another UE (e.g., UE 115b) to base station 105, or may be a downlink transmission (e.g., downlink transmission 375) from base station 105 to another UE (e.g., UE 115b). In any case, the transmission transmitted over the one or more resources indicated as available for EH by base station 105 may not be intended for UE 115, but UE 115 may receive the transmitted signal nonetheless (e.g., may be received as interference).

During operation of wireless communication system 300, UE 115 may determine whether to harvest energy from the transmission transmitted over the one or more resources indicated as available for EH by base station 105 based on indication 370 received from base station 105. In aspects, UE 115 may determine to harvest energy from the transmission, in which case UE 115 may turn on EH circuitry of UE 115, and may harvest energy from the received energy associated with the transmission transmitted over the one or more resources indicated as available for EH by base station 105. In another example, UE 115 may determine to forgo harvesting energy from the transmission, in which case UE 115 may not turn on the EH circuitry of UE 115, or may simply not perform EH from the received energy associated with the transmission transmitted over the one or more resources indicated as available for EH by base station 105.

As described above, the decision by UE 115 whether to harvest energy from the transmission transmitted over the one or more resources indicated as available for EH by base station 105 may be based on indication 370 received from base station 105. In aspects, indication 370 received from base station 105 may include additional information (e.g., additional to the indication of the one or more resources available for EH) that may assist UE 115 in determining whether to harvest energy from the transmission transmitted over the one or more resources indicated as available for EH by base station 105.

In aspects, indication 370 of the one or more resources available to UE 115 for EH may include an indication of a transmission power to be used for the transmission over the one or more resources indicated as available for EH by base station 105. In this manner, the transmission power indication may facilitate UE 115 deciding whether to harvest energy from the transmission. For example, UE 115 may compare the transmission power to be used for the transmission to a threshold and may determine that the transmission power does not exceed the threshold. This may indicate to UE 115 that harvesting energy from the transmission may not provide sufficient energy to offset the energy cost of turning on the EH circuitry and/or collecting the energy from the transmission. In this case, harvesting energy from the transmission with such a transmission power is not beneficial. In another example, however, UE 115 may determine that the transmission power exceeds the threshold. In this case, UE 115 may determine that harvesting energy from the transmission provides sufficient energy to offset the energy cost of turning on the EH circuitry and/or collecting the energy from the transmission and may provide more energy. In this case, UE 115 may determine that harvesting energy from the transmission with such a transmission power is beneficial as it may result in energy gains. Therefore, in this case, UE 115 may determine to harvest energy from the transmission transmitted over the one or more resources indicated as available for EH by base station 105.

In some aspects, indication 370 of the one or more resources available to UE 115 for EH may include an indication of a transmission source of the transmission over the one or more resources indicated as available for EH by base station 105. For example, indication 370 may indicate whether the transmission is being transmitted by a base station (e.g., base station 105) or by another UE (e.g., UE 115b). UE 115 may find this information useful, as it may allow UE 115 to determine further information from such an indication. For example, a transmission from base station 105 may indicate that the transmission power used in the transmission may be large enough to make EH profitable to UE 115. Additionally, UE 115 may be aware of pathloss configuration for transmissions from base station 105, as well as beam configuration and transmission source location, as UE 115 may be connected to base station 105. In this case, UE 115 may use such information to determine whether to harvest energy from the transmission from base station 105. In another example, indication 370 may indicate that the transmission is being transmitted from UE 115b, in which case UE 115 may determine that other considerations may be useful in determining whether to harvest energy from the transmission, such as transmission pathloss, transmission beam configuration of UE 115b, transmission power, etc.

In aspects, indication 370 of the one or more resources available to UE 115 for EH may include further information associated with the transmission over the one or more resources indicated as available for EH by base station 105. In particular, where the transmission is an uplink transmission (e.g., uplink transmission 380) from another UE (e.g., UE 115b) to base station 105, base station 105 may include, in indication 370, an estimated pathloss between UE 115b and UE 115. In this manner, UE 115 may determine whether the signal received at UE 115 from uplink transmission 380 transmitted from UE 115b over the one or more resources may provide enough energy to make EH profitable, such as when the pathloss is too high to provide sufficient RF energy. In aspects, indication 370 may also include a relative location of UE 115b with respect to UE 115.

In aspects, base station 105 may include, in indication 370, an indication of the transmission beam used by UE 115b to transmit uplink transmission 380 over the one or more resources to base station 105. The indication of the transmission beam may be useful to UE 115 by providing a direction from where the transmitted energy is coming, which may allow UE 115 to harvest energy in a more efficient and/or accurate manner than without this indication.

In aspects, the transmission beam used by UE 115b to transmit uplink transmission 380 over the one or more resources indicated as available for EH by base station 105 may be a beam determined, by the base station, to be the best or optimal beam for harvesting energy from uplink transmission 380. In aspects, this optimal beam for EH may be different from the beam that is best or optimal for transmitting uplink transmission 380 from UE 115b to base station 105. For example, a first beam configured for UE 115b may provide a highest performance (e.g., highest gain, least error rate, etc.) for transmitting uplink transmission 380 to base station 105. However, another beam may offer less performance for transmitting uplink transmission 380 to base station 105 but may offer a best or optimal performance for EH (e.g., may offer the highest gain for EH). In this case, base station 105 may determine the optimal beam for EH and may indicate to UE 115b to use the determined optimal beam for EH when transmitting uplink transmission 380 to base station 105 over the one or more resources identified as available by base station 105.

In aspects, determining the optimal beam for EH may be based on energy harvesting needs of UE 115 and/or performance requirements of uplink transmission 380 from UE 115b. For example, base station 105 may determine that UE 115 would benefit from EH. Base station 105 may also determine performance requirements (e.g., transmission rate and/or reliability requirement) of uplink transmission 380 to base station 105. Based on the performance requirements of uplink transmission 380 and/or the EH needs of UE 115, base station 105 may determine to indicate to UE 115b to use the optimal beam for EH to transmit uplink transmission 380, rather than the optimal beam for uplink transmission 380. In some aspects, the optimal beam for EH may be the same as the optimal beam for uplink transmission 380.

In aspects, uplink transmission 380 over the one or more resources indicated as available for EH by base station 105 using the optimal beam for EH may fail. In this case, UE 115b may be configured to fall back to using the optimal beam for uplink transmission based on the failure.

Figure 4:
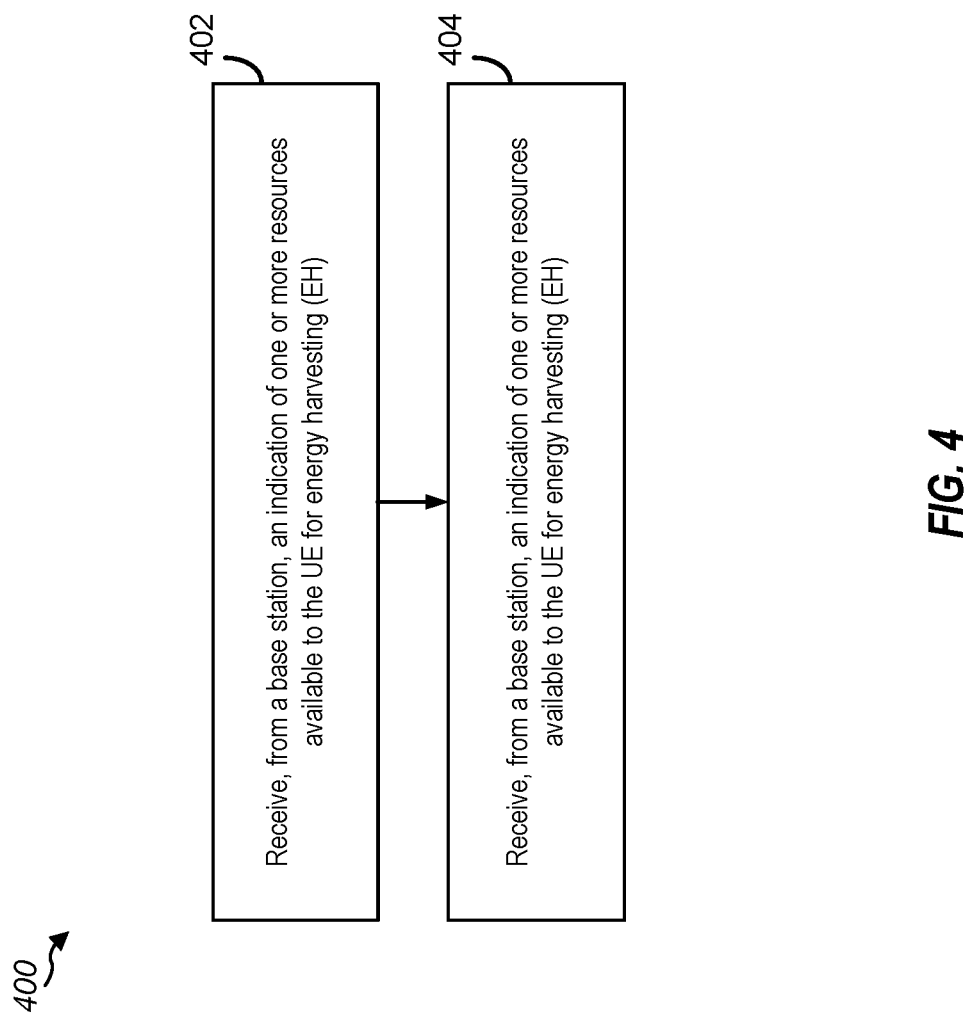
FIG. 4 is a flow diagram illustrating an example process that supports mechanisms for signaling resources available for energy harvesting to a UE according to one or more aspects.
Figure 6:
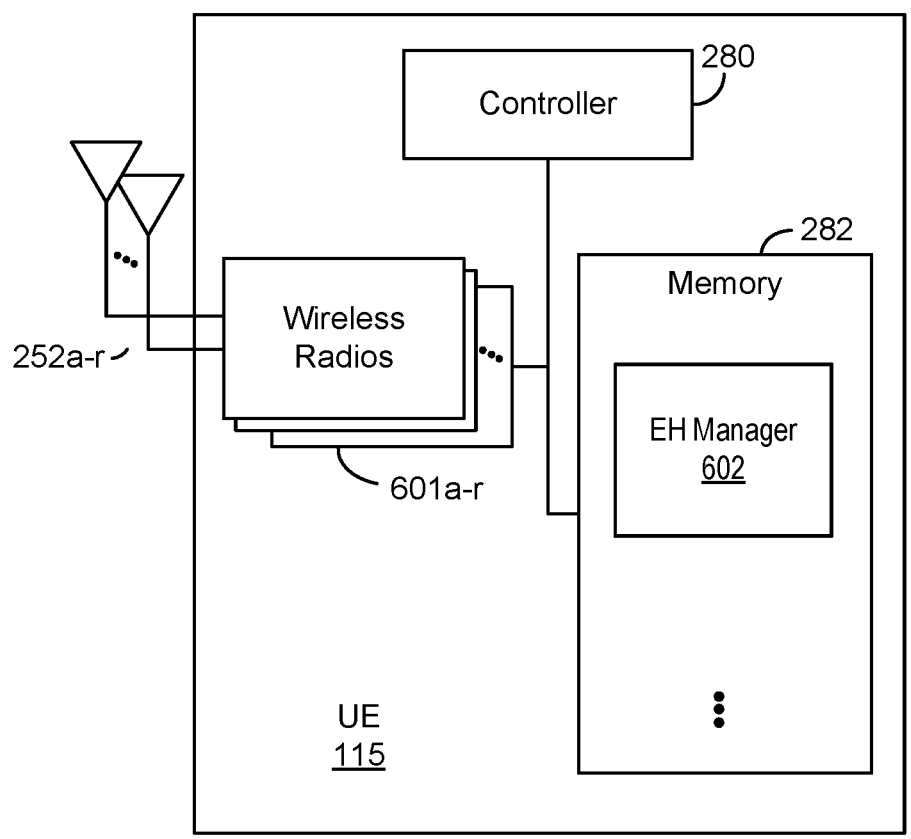
FIG. 6 is a block diagram of an example UE that supports mechanisms for signaling resources available for energy harvesting to a UE according to one or more aspects.

FIG. 4 is a flow diagram illustrating an example process 400 that provides for mechanisms for signaling resources available for EH to an EH UE in a wireless communication system according to one or more aspects. Operations of process 400 may be performed by a UE, such as UE 115 described above with reference to FIGS. 1-3. For example, example operations (also referred to as "blocks") of process 400 may enable UE 115 to support mechanisms for signaling resources available for EH to an EH UE. FIG. 6 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r includes various components and hardware, as illustrated in FIG. 2, including modulator/demodulators 254a-r, MIMO detector 256, receive processor 258, transmit processor 264, and TX MIMO processor 266.

At block 402 of process 400, a UE (e.g., UE 115) receives, from a base station (e.g., base station 105), an indication of one or more resources available to UE 115 for EH. In order to implement the functionality for such operations, UE 115, under control of controller/processor 280, may receive, from base station 105, an indication of one or more resources available to UE 115 for EH via wireless radios 601a-r and antennas 252a-r. In aspects, UE 115 may perform operations to receive, from base station 105, an indication of one or more resources available to UE 115 for EH according to operations and functionality as described above with reference to UE 115 and as illustrated in FIGS. 1-3.

At block 404 of process 400, UE 115 determines to harvest energy from a transmission over at least one of the one or more resources available to the UE for EH based on the indication received from base station 105. In order to implement the functionality for such operations, UE 115, under control of controller/processor 280, executes EH manager 602, stored in memory 282. The functionality implemented through the execution environment of EH manager 602 allows for UE 115 to perform operations to determine to harvest energy from a transmission over at least one of the one or more resources available to UE 115 for EH based on the indication received from base station 105 according to the various aspects herein. In aspects, UE 115 may perform operations to determine to harvest energy from a transmission over at least one of the one or more resources available to UE 115 for EH based on the indication received from base station 105 according to operations and functionality as described above with reference to UE 115 and as illustrated in FIGS. 1-3.

Figure 5:
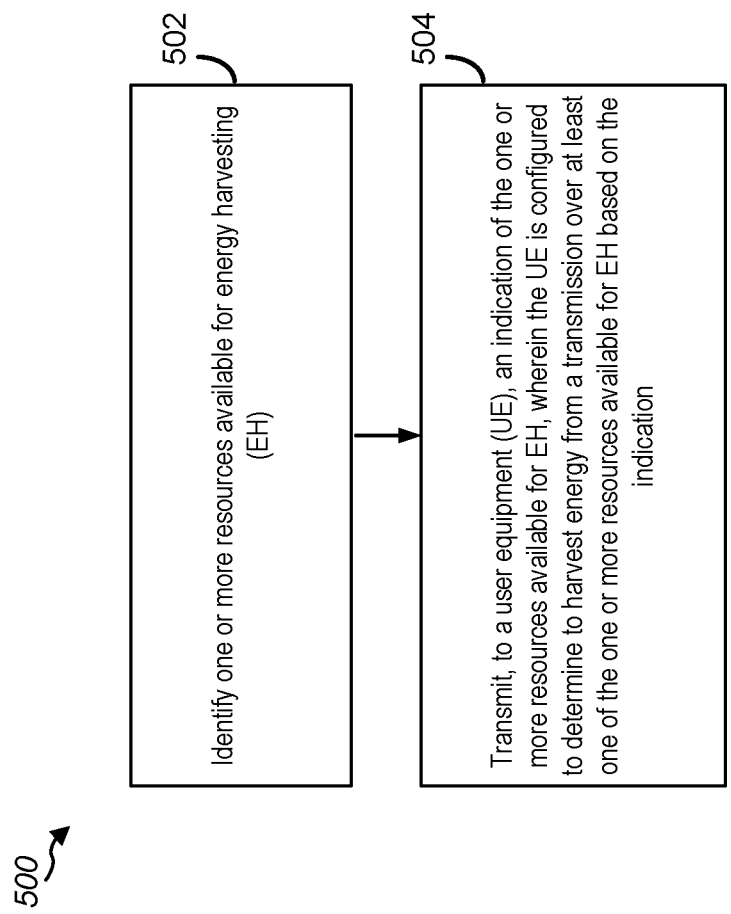
FIG. 5 is a flow diagram illustrating an example process that supports mechanisms for signaling resources available for energy harvesting to a UE according to one or more aspects.
Figure 7:
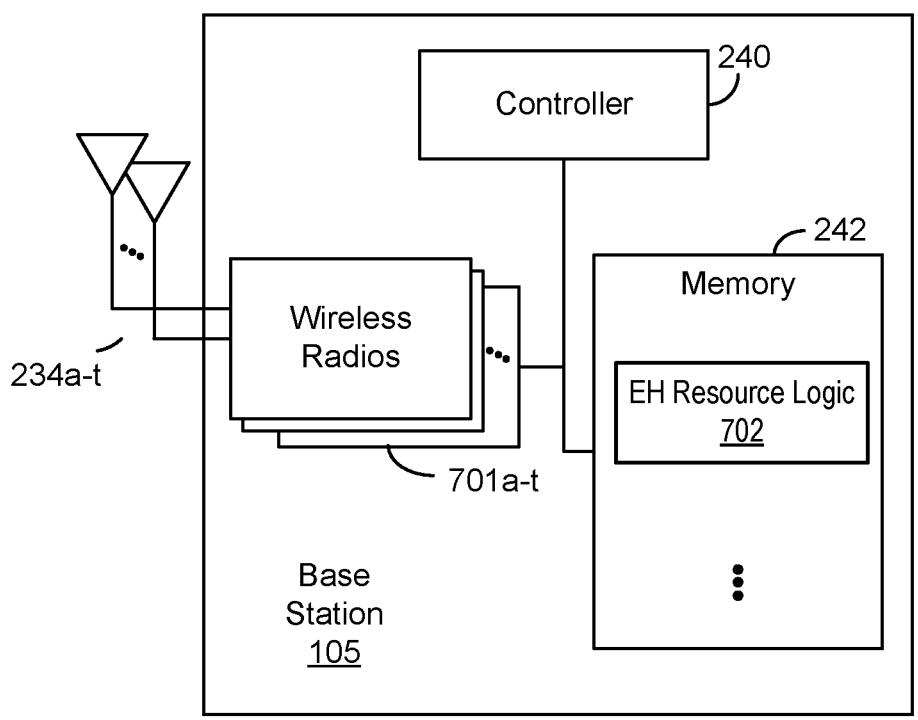
FIG. 7 is a block diagram of an example base station that supports mechanisms for signaling resources available for energy harvesting to a UE according to one or more aspects.

FIG. 5 is a block diagram illustrating an example an example process 500 that provides for mechanisms for signaling resources available for EH to an EH UE in a wireless communication system according to one or more aspects. Operations of process 500 may be performed by a base station, such as base station 105 described above with reference to FIGS. 1-3, or described with reference to FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701*a-t* and antennas 234*a-t*. Wireless radios 701*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 502 of process 500, a base station (e.g., base station 105) identifies one or more resources available for EH. In order to implement the functionality for such operations, base station 105, under control of controller/processor 240, executes EH resource logic 702, stored in memory 242. The functionality implemented through the execution environment of EH resource logic 702 allows for base station 105 to perform operations to identify one or more resources available for EH according to the various aspects herein. In aspects, base station 105 may perform operations to identify one or more resources available for EH according to operations and functionality as described above with reference to base station 105 and as illustrated in FIGS. 1-3.

At block 504 of process 500, base station 105 transmits, to UE 115, an indication of the one or more resources available for EH. In aspects, UE 115 may be configured to determine to harvest energy from a transmission over at least one of the one or more resources available for EH based on the indication from base station 105. In order to implement the functionality for such operations, the base station, under control of controller/processor 240, may transmit, to UE 115, the indication of the one or more resources available for EH via wireless radios 701*a-r* and antennas 234*a-t*. In aspects, base station 105 may perform operations to transmit, to UE 115, the indication of the one or more resources available for EH according to operations and functionality as described above with reference to base station 105 and as illustrated in FIGS. 1-3.

In one or more aspects, techniques for supporting mechanisms for signaling resources available for EH to an EH UE in a wireless communication system according to one or more aspects may include additional aspects, such as any single aspect or any combination of aspects described below or in connection with one or more other processes or devices described elsewhere herein. In a first aspect, supporting mechanisms for signaling resources available for EH to an EH UE in a wireless communication system may include an apparatus configured to receive, from a base station, an indication of one or more resources available to the UE for EH, and determining to harvest energy from a transmission over at least one of the one or more resources available to the UE for EH based on the indication. Additionally, the apparatus may perform or operate according to one or more aspects as described below. In some implementations, the apparatus includes a wireless device, such as a UE (e.g., UE 115 as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the one or more resources available to the UE for EH include a frequency resource and/or a time resource.

In a third aspect, alone or in combination with one or more of the first aspect or the second aspect, the transmission over the at least one of the one or more resources available to the UE for EH include a downlink transmission from the base station to one or more neighboring UE of the UE, and/or an uplink transmission from the base station to the one or more neighboring UE of the UE.

In a fourth aspect, alone or in combination with one or more of the first aspect through the third aspect, the indication of the one or more resources available to the UE for EH includes an indication of a transmission power of the transmission transmitted over the at least one of the one or more resources available to the UE for EH.

In a fifth aspect, alone or in combination with one or more of the first aspect through the fourth aspect, determining to harvest energy from the transmission over the at least one of the one or more resources available to the UE for EH based on the indication includes determining whether the transmission power of the transmission transmitted over the at least one of the one or more resources available to the UE for EH exceeds a predetermined threshold or not, the predetermined threshold indicating whether the energy harvested from the transmission over the at least one of the one or more the at least one of the one or more resources available to the UE for EH exceeds the energy cost of turning EH circuitry of the UE.

In a sixth aspect, alone or in combination with one or more of the first aspect through the fifth aspect, determining to harvest energy from the transmission over the at least one of the one or more resources available to the UE for EH based on the indication includes determining to harvest energy from the transmission over the at least one of the one or more resources available to the UE for EH when the transmission power of the transmission transmitted over the at least one of the one or more resources available to the UE for EH exceeds the predetermined threshold.

In a seventh aspect, alone or in combination with one or more of the first aspect through the sixth aspect, the techniques of the first aspect include determining to forgo harvesting energy from the transmission over the at least one of the one or more resources available to the UE for EH when the transmission power of the transmission transmitted over the at least one of the one or more resources available to the UE for EH does not exceed the predetermined threshold.

In an eighth aspect, alone or in combination with one or more of the first aspect through the seventh aspect, the indication of the one or more resources available to the UE for EH includes an indication of whether the transmission transmitted over the at least one of the one or more resources available to the UE for EH is a transmission from a base station or from another UE, an estimated pathloss associated with the transmission transmitted over the at least one of the one or more resources available to the UE for EH, an indication of a transmission beam associated with the transmission transmitted over the at least one of the one or more resources available to the UE for EH, and/or a location of a transmitting node transmitting the transmission over the at least one of the one or more resources available to the UE for EH relative to the UE.

In a ninth aspect, techniques for supporting mechanisms for signaling resources available for EH to an EH UE in a wireless communication system may include an apparatus configured to identify one or more resources available for EH, and transmitting, to a UE, an indication of the one or more resources available for EH. In aspects, the UE is configured to determine to harvest energy from a transmission over at least one of the one or more resources available for EH based on the indication. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a tenth aspect, alone or in combination with one or more of the ninth aspect through the ninth aspect, the one or more resources available for EH include a frequency resource and/or a time resource.

In an eleventh aspect, alone or in combination with one or more of the ninth aspect through the tenth aspect, the transmission over the at least one of the one or more resources available for EH include a downlink transmission from the base station to one or more neighboring UE of the UE, and/or an uplink transmission from the base station to the one or more neighboring UE of the UE.

In a twelfth aspect, alone or in combination with one or more of the ninth aspect through the eleventh aspect, the indication of the one or more resources available for EH includes an indication of a transmission power of the transmission transmitted over the at least one of the one or more resources available for EH.

In a thirteenth aspect, alone or in combination with one or more of the ninth aspect through the twelfth aspect, the indication of the one or more resources available for EH includes an indication of whether the transmission transmitted over the at least one of the one or more resources available for EH is a transmission from a base station or from another UE, an estimated pathloss associated with the transmission transmitted over the at least one of the one or more resources available for EH, an indication of a transmission beam associated with the transmission transmitted over the at least one of the one or more resources available for EH, and/or a location of a transmitting node transmitting the transmission over the at least one of the one or more resources available for EH relative to the UE.

In a fourteenth aspect, alone or in combination with one or more of the ninth aspect through the thirteenth aspect, the techniques of the ninth aspect include determining an optimal beam for EH by the UE from an uplink transmission transmitted by another UE to the base station.

In a fifteenth aspect, alone or in combination with one or more of the ninth aspect through the fourteenth aspect, the techniques of the ninth aspect include transmitting, to the another beam, an indication to use the optimal beam for transmitting the uplink transmission to the base station.

In a sixteenth aspect, alone or in combination with one or more of the ninth aspect through the fifteenth aspect, the optimal beam for EH is an optimal beam for transmitting the uplink transmission from the another UE to the base station, the optimal beam for transmitting the uplink transmission including a beam providing a highest performance for transmitting the uplink transmission to the base station from the another UE.

In a seventeenth aspect, alone or in combination with the sixteenth aspect, the optimal beam for EH is a different beam from the optimal beam for transmitting the uplink transmission from the another UE to the base station, the different beam including a beam providing a highest gain for EH by the UE from the uplink transmission from the another UE to the base station.

In an eighteenth aspect, alone or in combination with one or more of the ninth aspect through the seventeenth aspect, the another UE is configured to transmit the uplink transmission to the base station using the optimal beam for transmitting the uplink transmission when transmitting the uplink transmission to the base station using the different beam fails.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving, from a base station, a message including an indication of one or more resources available to the UE for energy harvesting (EH) and additional information to assist in determining whether to harvest energy, wherein the additional information includes:
   an estimated pathloss associated with an uplink transmission from one or more neighboring UEs of the UE over at least one of the one or more resources available to the UE for EH; and
   determining whether to harvest energy or to forgo harvesting energy from the uplink transmission from one or more neighboring UEs of the UE over at least one of the one or more resources available to the UE for EH based on the additional information, wherein determining whether to harvest energy or to forgo harvesting energy includes:
   determining, based on the estimated pathloss, whether the uplink transmission provides enough energy to make EH profitable to the UE.

2. The method of claim 1, wherein the one or more resources available to the UE for EH include one or more of:
   a frequency resource; or
   a time resource.

3. The method of claim 1, wherein transmission over the at least one of the one or more resources available to the UE for EH further includes:
   a downlink transmission from the base station to the one or more neighboring UEs of the UE.

4. The method of claim 1, wherein the additional information includes an indication of a transmission power of the uplink transmission transmitted over the at least one of the one or more resources available to the UE for EH.

5. The method of claim 4, wherein determining whether to harvest energy or to forgo harvesting energy from the uplink transmission over the at least one of the one or more resources available to the UE for EH based on the additional information includes:
   determining whether transmission power of the uplink transmission transmitted over the at least one of the one or more resources available to the UE for EH exceeds a predetermined threshold or not, the predetermined threshold indicating whether the energy harvested from the uplink transmission over the at least one of the one or more resources available to the UE for EH exceeds an energy cost of turning on EH circuitry of the UE; and
   determining to harvest energy from the uplink transmission over the at least one of the one or more resources available to the UE for EH when the transmission power of the uplink transmission transmitted over the at least one of the one or more resources available to the UE for EH exceeds the predetermined threshold.

6. The method of claim 5, further comprising:
   determining to forgo harvesting energy from the uplink transmission over the at least one of the one or more resources available to the UE for EH when the transmission power of the uplink transmission transmitted over the at least one of the one or more resources available to the UE for EH does not exceed the predetermined threshold.

7. A method of wireless communication performed by a base station, the method comprising:
   identifying one or more resources available for energy harvesting (EH); and
   transmitting, to a user equipment (UE), a message including an indication of the one or more resources available for EH and additional information to assist the UE in determining whether to harvest energy, wherein the UE is configured to determine whether to harvest energy or to forgo harvesting energy from an uplink transmission from one or more neighboring UEs of the UE over at least one of the one or more resources available for EH based on the additional information, wherein the additional information includes;
   an estimated pathloss associated with the uplink transmission transmitted over the at least one of the one or more resources available to the UE for EH configured for the UE determined whether the uplink transmission provides enough energy to make EH profitable to the UE.

8. The method of claim 7, wherein the one or more resources available for EH include one or more of:
a frequency resource; or
a time resource.

9. The method of claim 7, wherein transmission over the at least one of the one or more resources available for EH further includes:
a downlink transmission from the base station to the one or more neighboring UE of the UE.

10. The method of claim 7, wherein the additional information includes an indication of a transmission power of the uplink transmission transmitted over the at least one of the one or more resources available for EH.

11. The method of claim 7, further comprising:
determining an optimal beam for EH by the UE from the uplink transmission transmitted by the one or more neighboring UEs to the base station; and
transmitting, to the one or more neighboring UEs, an indication to use the optimal beam for transmitting the uplink transmission to the base station.

12. The method of claim 11, wherein the optimal beam for EH is one of:
an optimal beam for transmitting the uplink transmission from the one or more neighboring UEs to the base station, the optimal beam for transmitting the uplink transmission including a beam providing a highest performance for transmitting the uplink transmission to the base station from the one or more neighboring UEs; or
a different beam from the optimal beam for transmitting the uplink transmission from the one or more neighboring UEs to the base station, the different beam including a beam providing a highest gain for EH by the UE from the uplink transmission from the one or more neighboring UEs to the base station.

13. The method of claim 12, wherein the one or more neighboring UEs are configured to transmit the uplink transmission to the base station using the optimal beam for transmitting the uplink transmission when transmitting the uplink transmission to the base station using the different beam fails.

14. A user equipment (UE), comprising:
a processing system that includes at least one processor and at least one memory coupled to the at least one processor, the processing system configured to cause the UE to perform operations including:
receiving, from a base station, a message including an indication of one or more resources available to the UE for energy harvesting (EH) and additional information to assist in determining whether to harvest energy, wherein the additional information includes:
an estimated pathloss associated with an uplink transmission from one or more neighboring UEs of the UE over at least one of the one or more resources available to the UE for EH; and
determining whether to harvest energy or to forgo harvesting energy from the uplink transmission from one or more neighboring UEs of the UE over at least one of the one or more resources available to the UE for EH based on the additional information, wherein determining whether to harvest energy or to forgo harvesting energy includes:

determining, based on the estimated pathloss, whether the uplink transmission provides enough energy to make EH profitable to the UE.

15. The UE of claim 14, wherein the one or more resources available to the UE for EH include one or more of:
a frequency resource; or
a time resource.

16. The UE of claim 14, wherein transmission over the at least one of the one or more resources available to the UE for EH further includes:
a downlink transmission from the base station to the one or more neighboring UEs of the UE.

17. The UE of claim 14, wherein the additional information includes an indication of a transmission power of the uplink transmission transmitted over the at least one of the one or more resources available to the UE for EH.

18. The UE of claim 17, wherein determining whether to harvest energy or to forgo harvesting energy from the uplink transmission over the at least one of the one or more resources available to the UE for EH based on the additional information includes:
determining whether a transmission power of the uplink transmission transmitted over the at least one of the one or more resources available to the UE for EH exceeds a predetermined threshold or not, the predetermined threshold indicating whether the energy harvested from the uplink transmission over the at least one of the one or more resources available to the UE for EH exceeds an energy cost of turning on EH circuitry of the UE; and
determining to harvest energy from the uplink transmission over the at least one of the one or more resources available to the UE for EH when the transmission power of the uplink transmission transmitted over the at least one of the one or more resources available to the UE for EH exceeds the predetermined threshold.

19. The UE of claim 18, wherein the operations further include:
determining to forgo harvesting energy from the uplink transmission over the at least one of the one or more resources available to the UE for EH when the transmission power of the uplink transmission transmitted over the at least one of the one or more resources available to the UE for EH does not exceed the predetermined threshold.

20. A base station, comprising:
a processing system that includes at least one processor and at least one memory coupled to the at least one processor, the processing system configured to cause the base station to perform operations including:
identifying one or more resources available for energy harvesting (EH); and
transmitting, to a user equipment (UE), a message including an indication of the one or more resources available for EH and additional information to assist the UE in determining whether to harvest energy, wherein the UE is configured to determine whether to harvest energy or to forgo harvesting energy from an uplink transmission from one or more neighboring UEs of the UE over at least one of the one or more resources available for EH based on the additional information, wherein the additional information includes:
an estimated pathloss associated with the uplink transmission transmitted over the at least one of the one or more resources available to the UE for EH configured for the UE determining whether the uplink transmission provides enough energy to make EH profitable to the UE.

21. The base station of claim 20, wherein the one or more resources available for EH include one or more of:
- a frequency resource; or
- a time resource.

22. The base station of claim 20, wherein transmission over the at least one of the one or more resources available for EH further includes:
- a downlink transmission from the base station to the one or more neighboring UEs of the UE.

23. The base station of claim 20, wherein the additional information includes an indication of a transmission power of the uplink transmission transmitted over the at least one of the one or more resources available for EH.

24. The base station of claim 20, further comprising:
- determining an optimal beam for EH by the UE from the uplink transmission transmitted by the one or more neighboring UEs to the base station; and
- transmitting, to the one or more neighboring UEs, an indication to use the optimal beam for transmitting the uplink transmission to the base station.

25. The base station of claim 24, wherein the optimal beam for EH is one of:
- an optimal beam for transmitting the uplink transmission from the one or more neighboring UEs to the base station, the optimal beam for transmitting the uplink transmission including a beam providing a highest performance for transmitting the uplink transmission to the base station from the one or more neighboring UEs; or
- a different beam from the optimal beam for transmitting the uplink transmission from the one or more neighboring UEs to the base station, the different beam including a beam providing a highest gain for EH by the UE from the uplink transmission from the one or more neighboring UEs to the base station.

26. The base station of claim 25, wherein the one or more neighboring UEs is configured to transmit the uplink transmission to the base station using the optimal beam for transmitting the uplink transmission when transmitting the uplink transmission to the base station using the different beam fails.

* * * * *